(No Model.)  3 Sheets—Sheet 2.

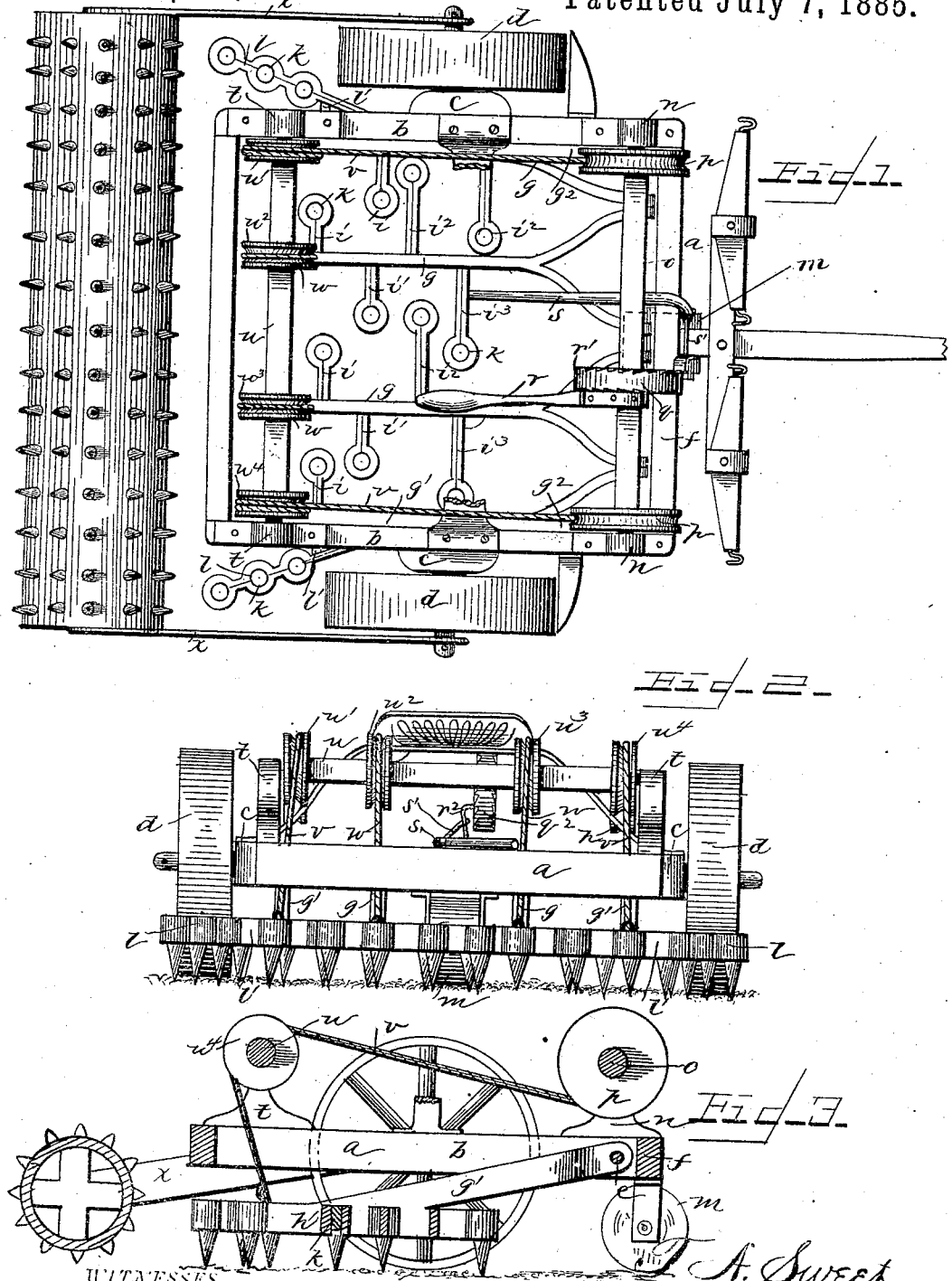

T. A. SWEET.
WHEEL HARROW.

No. 321,922.  Patented July 7, 1885.

WITNESSES

Thomas A. Sweet
INVENTOR

Attorneys (No Model.)  T. A. SWEET.  3 Sheets—Sheet 3.
WHEEL HARROW.

No. 321,922.  Patented July 7, 1885.

WITNESSES
C. W. Dashiell
E. G. Siggers

T. A. Sweet,
INVENTOR

By C. A. Snow & Co.
Attorneys

UNITED STATES PATENT OFFICE.

THOMAS ALBERT SWEET, OF CAMBRIA, CALIFORNIA.

WHEEL-HARROW.

SPECIFICATION forming part of Letters Patent No. 321,922, dated July 7, 1885.

Application filed April 19, 1884. (No model.)

*To all whom it may concern:*

Be it known that I, THOMAS A. SWEET, a citizen of the United States, residing at Cambria, in the county of San Luis Obispo and State of California, have invented a new and useful Wheel-Harrow, of which the following is a specification, reference being had to the accompanying drawings.

This invention has relation to wheel-harrows and rollers and pulverizers combined; and it consists in the construction and novel arrangement of parts, as will be hereinafter fully described, and particularly pointed out in the claims.

Figure 4:
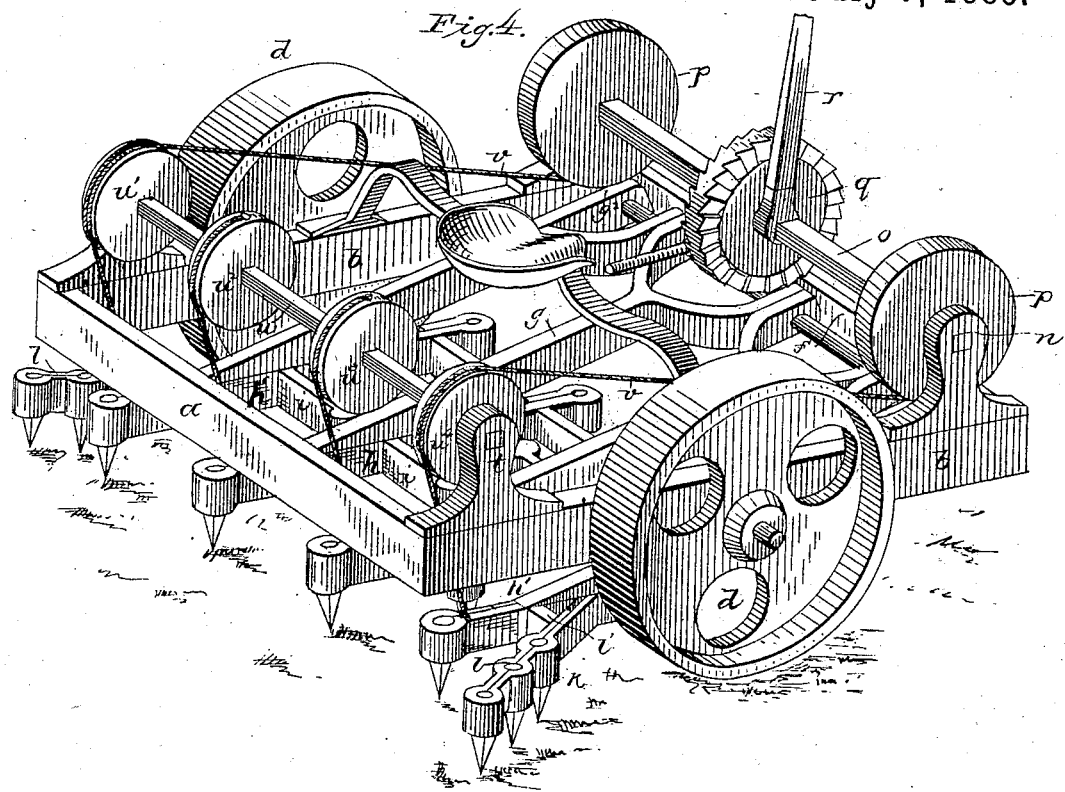
Figure 5:
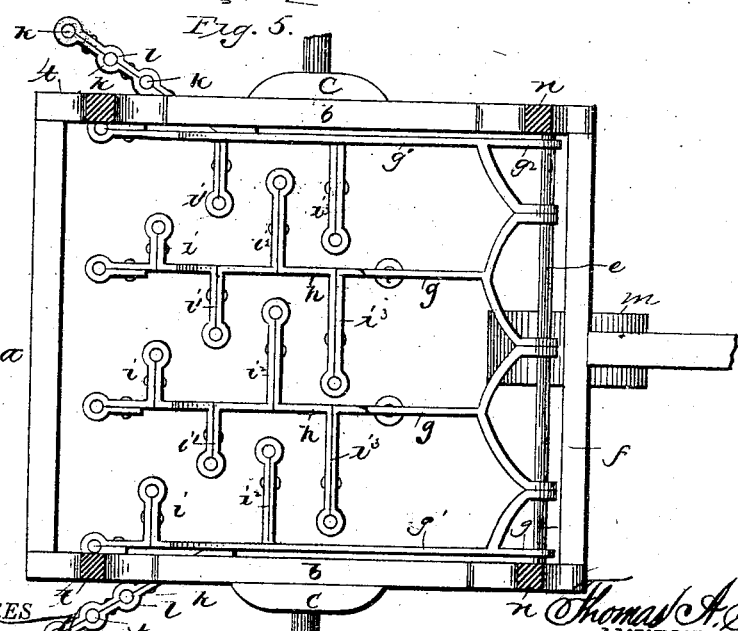
Figure 6:
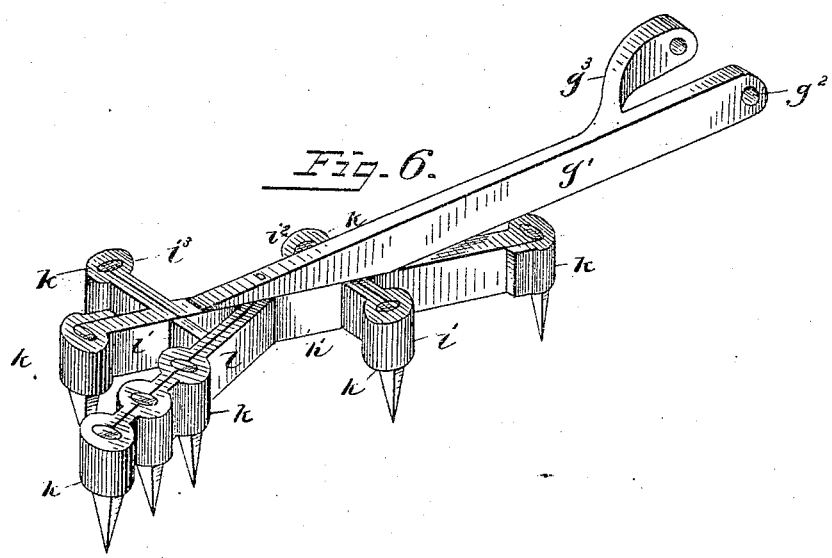
Figure 7:
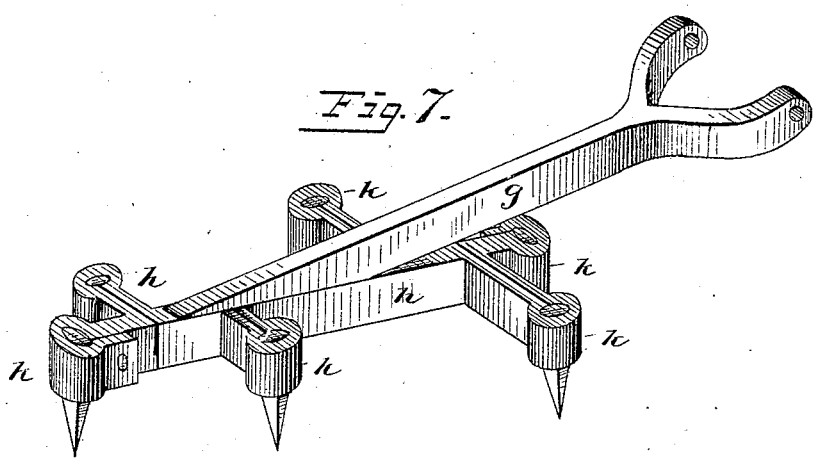

Figure 1 is a plan view of a combined implement embodying the improvements of my invention, the driver's seat and its arched support being broken away or removed to give a better view of the harrow-beams. Fig. 2 is a rear elevation, the roller and pulverizer being removed; and Fig. 3 is a vertical longitudinal sectional view of the combined implement. Fig. 4 is a view in perspective with the pulverizer removed. Fig. 5 is a sectional view showing a plan of the harrow-frame and harrow-beams. Fig. 6 is a detailed perspective of one of the outside harrow-beams. Fig. 7 is a similar view of one of the inside harrow-beams.

Referring by letter to the accompanying drawings, $a$ designates the frame of the harrow, which is rectangular in form, and is provided on the outer faces of its side beams, $b$ $b$, with journals $c$ $c$, on which the supporting-wheels $d$ $d$ are mounted, so that there is no axle traversing the frame. A shaft, $e$, traverses the frame laterally immediately in rear of the front cross-beam $f$.

$h'$ represents harrow-beams, each of which is bent from a single piece of metal, so as to form the longitudinal main portion of the beam, and the arms $i$, $i^2$, and $i^3$, which extend at right angles from the beam in the same horizontal plane therewith, and have eyes $k$ formed in their outer ends for the reception of the vertical harrow-teeth. Two of these arms project from the inner side of the beam, and the remaining arm projects from the outer side thereof, as shown. Near the rear end of the beam is an oblique arm, $l$, which is formed integrally with the beam, and which extends outwardly and rearwardly from the beam, and is formed with a series of eyes, $k$, for the reception of the harrow-teeth. A lateral brace, $l'$, connects this arm to the beam. Eyes $k$ are also formed in the extremities of the beam, as shown. Projecting from the upper side of the beam, near its center, is the inclined extension or draft beam $g$, which extends upwardly and forwardly, and is provided at its front end with an opening, $g^2$, through which the shaft $e$ passes, and by this means the beams $h'$ are pivoted to the frame. Side arms, $g^3$, are curved inwardly from near the outer ends of the extensions $g'$, and are also provided with openings for the shaft $e$.

Intermediate beams, $h$, which are provided with extensions $g$, that are bifurcated at their front ends to form pivotal connection with the shaft $e$, are placed between the beams $h'$, and are constructed similarly to them, with the exception that they have two projecting arms on each side, and that they are without the oblique arms $l$, with which the beams $h'$ are provided, and which are for the purpose of receiving harrow-teeth that are designed to operate directly in rear of the supporting-wheels. The bifurcated ends of the extensions $g$ and the arms $g^3$ of the extensions $g'$ prevent lateral play upon the shaft $e$, but allow to the beams free independent vertical play thereupon.

The front of the frame A is provided with a caster-wheel, $m$, to assist in guiding and turning the machine, and is also provided with a tongue and whiffletrees for the attachment of the team.

Standards $n$ $n$ rise from the side beams, $b$ $b$, near their front ends, and in the upper ends of said standards bearings are provided for the journals of a shaft, $o$, having a grooved pulley, $p$, near each end, fixed thereon, so as to turn with the shaft $o$.

Near the middle of the shaft $o$ is provided a double ratchet-wheel, $q$, the ratchet-teeth being in its opposite faces near the edges, said wheel $q$ being also fixed upon the shaft to turn with it.

A ratchet-lever, $r$, pivoted to the shaft $o$, is provided with a pawl, $r'$, which may be brought into engagement with the teeth on the right side of the wheel when desired to turn the pulleys.

To the tongue or frame at the left-hand side of the ratchet-wheel $q$ is secured a vertically-arranged spring-detent, $r^2$, which normally engages the teeth on the left-hand face of the ratchet-wheel and prevents it from turning backward. This detent is thrown out of engagement with the ratchet-wheel $q$ when necessary by a foot-lever, $s$, pivoted to the front rail of the frame $a$ within reach of the driver's foot, and connected by a rod, $s'$, to the spring-detent, as shown.

Near the rear ends of the side beams, $b\ b$, rise two standards, $t\ t$, having bearings near their upper ends for the journals of a shaft, $u$, provided with four fixed pulleys, $u'\ u^2\ u^3\ u^4$, one directly above each main harrow-beam $h\ h'\ h'$.

Ropes $v\ v$, connected at their front ends in the grooves of the pulleys $p\ p$, extend back and pass over the outer pulleys, $u'$ and $u^4$, of the rear shaft, $u$, and their rear ends are connected to the rear ends of the main harrow-beam $h'\ h'$. The intermediate harrow-beams, $h\ h$, are connected by short ropes $w\ w$ to the pulleys $u^2\ u^3$. By operating the pivoted ratchet-lever $r$ to turn the ratchet-wheel $q$ toward the operator, the ropes will be wound on the pulleys, and the harrow-beams carrying the harrow-teeth will be raised, and will be held in the position to which they have been raised by the spring-detent, until it is designedly released and the beams lowered to the position desired. When on the ground, the harrow-sections have independent vertical play; but when raised or lowered they all move together.

As the harrow-teeth are removable, they may be all removed, and a suitable number of cultivator-teeth, properly arranged to perform the work, may be secured in the eyes, thereby converting the harrow into a cultivator by simply changing the style and number of the teeth.

The roller and pulverizer is hollow, and is provided with a number of rows of radially-projecting teeth. It is journaled in the rear ends of arms $x\ x$, the forward ends of which have holes, which receive the projecting ends of the journals outside of the supporting-wheels of the harrow-frame, by removing the linchpins, slipping the arms over the ends of the journals $c\ c$, and replacing the linchpins. The roller and pulverizer is to follow the harrow only. The harrow-teeth may, however, be raised out of the ground and the roller and pulverizer alone used when desired.

This implement possesses simplicity, durability, cheapness, and performs its work thoroughly, and it is not likely to get out of order.

Having thus fully described my invention, what I claim, and desire to secure by Letters Patent of the United States, is—

1. In a wheel-harrow, the beam $h'$, constructed with inclined pivotal extension $g'$, and having arms $i, i'$, and $i^2$, which extend at right angles thereto, and a rearwardly and outwardly extending oblique arm, $l$, the said arms being formed integrally with the beam and bent in a horizontal plane, and having eyes that are adapted to receive the vertical harrow-teeth, substantially as described.

2. The combination, in a wheel-harrow, of the main frame, the beams $h$ and $h'$, having inclined pivotal extensions, the beams $h$ being provided with arms, which are bent at right angles thereto, and having eyes adapted to receive the harrow-teeth, and the beams $h'$, provided with similar arms, and having oblique arms $l$, for carrying teeth to work in rear of the supporting-wheels, the beams being pivoted to the frame and allowed vertical independent movement, and means for raising said beams simultaneously, substantially as described.

In testimony that I claim the foregoing as my own I have hereto affixed my signature in presence of two witnesses.

THOMAS ALBERT SWEET.

Witnesses:
J. H. EUBANKS,
A. H. PETERSON.